US012326201B2

(12) United States Patent
Melsheimer et al.

(10) Patent No.: US 12,326,201 B2
(45) Date of Patent: Jun. 10, 2025

(54) METHODS AND SYSTEMS FOR PULLING BUNDLES OF CONDUITS

(71) Applicant: Melfred Borzall, Inc., Santa Maria, CA (US)

(72) Inventors: Eric Melsheimer, Santa Maria, CA (US); Ricky Escobar, Santa Maria, CA (US)

(73) Assignee: Melfred Borzall, Inc., Santa Maria, CA (US)

( * ) Notice: Subject to any disclaimer, the term of this patent is extended or adjusted under 35 U.S.C. 154(b) by 0 days.

(21) Appl. No.: 18/633,313

(22) Filed: Apr. 11, 2024

(65) Prior Publication Data

US 2024/0344634 A1  Oct. 17, 2024

Related U.S. Application Data

(60) Provisional application No. 63/459,183, filed on Apr. 13, 2023.

(51) Int. Cl.
*F16L 1/06* (2006.01)
*F16L 1/028* (2006.01)

(52) U.S. Cl.
CPC .............. *F16L 1/06* (2013.01); *F16L 1/028* (2013.01)

(58) Field of Classification Search
CPC .......... H02G 1/081; G02B 6/545; F16G 11/06
See application file for complete search history.

(56) References Cited

U.S. PATENT DOCUMENTS

| 4,337,923 A | * | 7/1982 | Smith ...................... F16G 11/06 174/79 |
| 5,013,125 A | * | 5/1991 | Nilsson ................ G02B 6/4477 254/134.3 R |
| 5,039,196 A | * | 8/1991 | Nilsson .................. G02B 6/545 294/102.1 |
| 5,654,526 A | * | 8/1997 | Sharp ....................... H02G 3/06 285/94 |
| 6,104,855 A | * | 8/2000 | Jeon ...................... G02B 6/3878 95/137 |

(Continued)

FOREIGN PATENT DOCUMENTS

DE  102015006501 A1 * 11/2016 .............. F16L 1/038

OTHER PUBLICATIONS

DE102015006501A1 Translation (Year: 2015).*

(Continued)

*Primary Examiner* — Michael W Hotchkiss
(74) *Attorney, Agent, or Firm* — Fitch, Even, Tabin & Flannery LLP

(57) ABSTRACT

The present disclosure describes a pulling device that is used to attach to a non-circular bundle of conduits during installation of micro-duct bundles using horizontal directional drilling (HDD). According to some embodiments, the pulling device includes an interior pocket at a distal end to receive one end of the bundle of conduits and is shaped to constrain a rotational orientation of the bundle of conduits within the pulling device. Additionally, the pulling device includes a pulling eye configured to provide for the pulling device to be pulled through a bore hole in order to be installed underground. The pulling device includes one or more apertures on the exterior surface that receive a fastener to attach the bundle of conduits for pulling through the bore hole.

29 Claims, 15 Drawing Sheets

(56) References Cited

U.S. PATENT DOCUMENTS

| | | | | |
|---|---|---|---|---|
| 6,979,776 | B1* | 12/2005 | Zimmermann | H02G 1/06 |
| | | | | 174/37 |
| 7,478,794 | B1* | 1/2009 | Gohlke | B66C 1/42 |
| | | | | 254/134.3 R |
| 7,563,100 | B1* | 7/2009 | Smith | F16L 25/01 |
| | | | | 439/33 |
| 9,027,908 | B1* | 5/2015 | Calhoun | F16G 11/048 |
| | | | | 254/134.3 R |
| 10,666,027 | B2* | 5/2020 | Kim | H02G 1/081 |
| 11,143,834 | B2* | 10/2021 | Gunther | G02B 6/54 |
| 2019/0067920 | A1* | 2/2019 | Kim | H02G 1/08 |
| 2021/0262605 | A1* | 8/2021 | Welker | F16L 47/02 |
| 2022/0283396 | A1* | 9/2022 | Houser | G02B 6/4435 |
| 2023/0291184 | A1* | 9/2023 | Mes | H02G 1/127 |

OTHER PUBLICATIONS

Brewis Engineering Ltd; "Large Towing Heads"; https://www.brewisengineering.co.uk/large-towing-heads; 2024; downloaded May 24, 2024; 4 pages.

Pipe Equipment Specialists LTD; "Bolt On Towing Head"; https://pipe-equipment.co.uk/product/bolt-on-towing-head/; Jun. 16, 2022; downloaded May 24, 2024; 4 pages.

\* cited by examiner

METHODS AND SYSTEMS FOR PULLING BUNDLES OF CONDUITS

CROSS-REFERENCE TO RELATED APPLICATION

This application claims the benefit of U.S. Provisional Application No. 63/459,183, filed Apr. 13, 2023, for PULLING DEVICE FOR BUNDLES OF MULTIPLE PLASTIC PIPES, which is incorporated in its entirety herein by reference.

BACKGROUND OF THE INVENTION

1. Field of the Invention

The present invention relates generally to infrastructure (e.g., conduit) systems, and more specifically to methods, systems, and devices for pulling a bundle of conduits.

2. Discussion of the Related Art

Infrastructure systems, and more specifically conduit systems, may facilitate various use cases such as transportation, communication, utility distribution, etc. For instance, some systems may implement underground conduits (e.g., such as underground plastic pipes or ducts) to support various utilities such as telecommunications, water supply, sewerage, etc. Such systems may demand efficient and precise placement of underground conduits, for example, to minimize disruption to surface activities and minimize environmental impact. Some techniques, such as Horizontal Directional Drilling (HDD), may be implemented to install underground conduits. HDD techniques may include creating a bore underground using a drill rig and subsequently drawing one or more conduit(s) into position using the HDD drill rig. HDD techniques, or other conduit placement techniques, may thus be implemented to install and enable various conduits, such as plastic pipes, micro-ducts, etc.

However, in some cases, friction within the drilled hole and/or improper attachment of the conduit to a pulling device (or puller) may impede the smooth pulling of conduits through the bore. Existing conduit pulling systems are deficient. For example, pulling systems (or pullers) that grip the inside of plastic pipes may not be able to firmly, or securely, attach to multiple micro-duct bundles. Moreover, in some cases, conduits with small diameters, and/or a tight packing of a bundle of conduits, may make it difficult for conventional pullers to grip the conduits from the inside. Such deficiencies of conventional systems may result in improper attachment of conduit(s) to a pulling device, improper placement of conduits, installation delays, etc.

Accordingly, there is a need in the art for improved conduit pulling systems (e.g., an improved puller for a bundle of conduits) that are capable of effectively grabbing and pulling bundles of conduits (e.g., for installation via HDD techniques).

SUMMARY

The present disclosure describes methods, systems, and devices for pulling a bundle of conduits (e.g., a bundle of multiple small plastic pipes, or micro-ducts, that are bundled together such that the bundle has a non-circular exterior profile). Embodiments of the present disclosure include a pulling device with an interior pocket configured to secure (e.g., grab, constrain, etc.) a bundle of conduits. At least a portion of the interior pocket is non-circular in shape to match the exterior shape of bundle of conduits. In other words, the interior pocket of the pulling device is configured to match the cross section of the bundle of conduits to securely constrain the bundle of conduits. Additionally, fasteners (e.g., screws) are driven through the pulling device and intersect at least a portion of the individual conduits within the bundle, approximately through the centers of the individual conduits. Accordingly, embodiments of the present disclosure are able to create a strong connection between the pulling device and the bundle of conduits which provides a secure system for underground installation of the bundle of conduits.

An apparatus, system, and method for pulling a bundle of conduits are described. One or more aspects of the apparatus and system include an interior pocket at a distal end to receive one end of the bundle of conduits, with at least a portion of the interior pocket having a non-circular profile, shaped to constrain a rotational orientation of the bundle of conduits within the pulling device, wherein the interior pocket has one open end and one closed end; a pulling eye configured to allow the pulling device to be pulled through a bore hole; and one or more apertures extend from an exterior of the pulling device to the interior pocket, sized and located around a perimeter surface of the exterior the pulling device to receive a fastener or fasteners, where the one or more apertures are at one or more angles between positive and negative 60 degrees from normal relative to a central axis of the pulling device.

A method for pulling a bundle of conduits is described. One or more aspects of the method include providing a pulling device comprising an interior pocket at a distal end to receive one end of the bundle of conduits, with at least a portion of the interior pocket having a non-circular profile, shaped to constrain a rotational orientation of the bundle of conduits within the pulling device, wherein the interior pocket has one open end and one closed end; inserting one end of the bundle of conduits into the interior pocket of the pulling device; attaching the pulling device to a pulling mechanism via a pulling eye configured to allow the pulling device to be pulled through a bore hole; and pulling the pulling device and the bundle of conduits having been attached to the pulling mechanism through the bore hole using the pulling mechanism. In some aspects, the pulling device further comprises one or more apertures extending from a perimeter surface of an exterior of the pulling device to the interior pocket, the one or more apertures being sized and located to receive a fastener or fasteners, wherein the one or more apertures are at one or more angles between positive and negative 60 degrees from normal relative to a central axis of the pulling device.

A method for making a pulling device for a bundle of conduits is described. One or more aspects of the method include forming an interior pocket at a distal end of the pulling device to receive one end of the bundle of conduits; shaping at least a portion of the interior pocket to have a non-circular profile to constrain rotational orientation of the bundle of conduits within the pulling device; and creating one or more apertures extending from a perimeter surface of an exterior of the pulling device to the interior pocket, sized and located to receive a fastener fastener. In some aspects, the one or more apertures are at angles between positive and negative 60 degrees from normal relative to a central axis of the pulling device.

DETAILED DESCRIPTION

Figure 1:
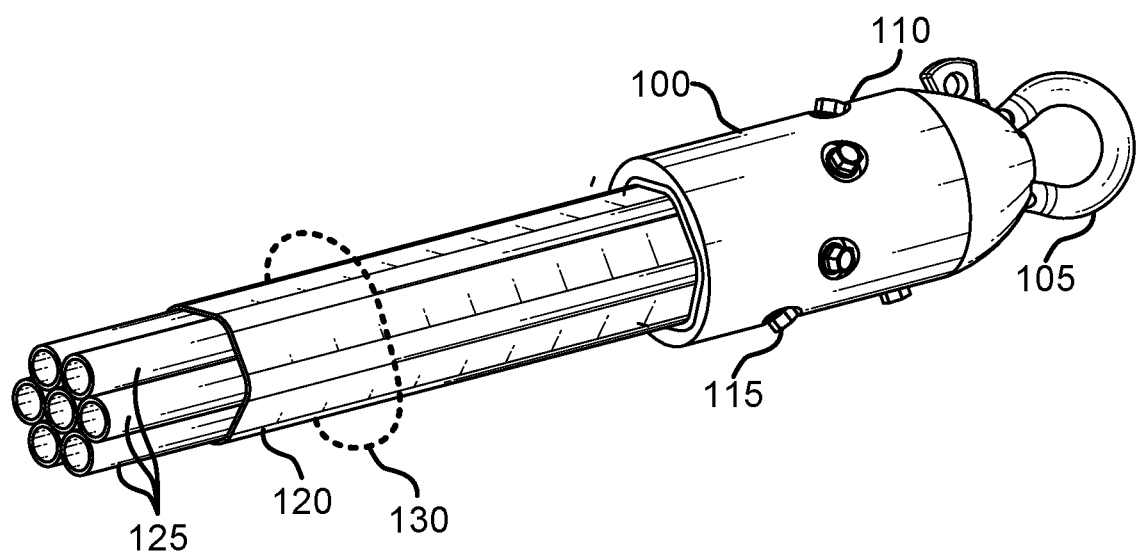
FIG. 1 shows an example of a pulling device, according to aspects of the present disclosure.

Conduits (e.g., plastic pipes, micro-ducts, cables, etc.) may be installed and utilized underground to support various use cases as such electrical utilities, telecommunications, water supply, gas supply, sewerage, etc.

The present disclosure describes methods, systems, and devices for pulling a bundle of conduits. An example embodiment includes a pulling device for installation of non-circular bundles of conduits (e.g., a bundle or grouping of small plastic pipes or micro-ducts that together have a non-circular exterior shape). In some cases, the pulling device may be used for installation of bundles of conduits (e.g., underground installation of conduits using horizontal directional drilling (HDD)). In some aspects, as described in more detail herein, the pulling device includes a non-circular interior pocket shaped to match at least a gripping portion of the exterior shape of the bundle of conduits. For instance, the non-circular shaped portion of the interior pocket may rotationally orient the pulling device such that fasteners (i.e., screws) may be driven through the pulling device to intersect at least a portion of the individual conduits (e.g., approximately through the centers of the individual conduits). Accordingly, by using fasteners to intersect at least a portion of the individual conduits, embodiments of the present disclosure may be implemented create a strong connection between the pulling device and the bundle of conduits.

As such, the present disclosure provides improved methods, systems, and devices for installing bundles of conduits. The techniques and systems described herein may result in more secure attachment of conduit(s) to a pulling device, which may generally enable improved infrastructure systems. For instance, more diverse conduit configurations (e.g., more numerous conduits, conduits with smaller diameters, more tightly packed bundles of conduits, and more precise placement of conduits) may be deployed/installed according to one or more aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, examples such as of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

A process of Horizontal Directional Drilling (HDD) commonly includes installing plastic pipes or ducts underground. The HDD process involves the drill rig first drilling a "pilot bore" which establishes the path of the bore and the location of the pipes to be installed underground. Next, the plastic pipe(s) are pulled into place by the HDD drill rig. In some cases, friction in the drilled hole may create resistance to pulling the plastic pipe back through the hole.

A plurality of methods are used to attach a puller to the plastic pipe(s) so that the plastic pipe(s) can be pulled appropriately in place. For instance, a common method involves utilizing a wire mesh grip affixed to the exterior of the pipe, which relies on friction to secure the pipe. Alternatively, some approaches involve gripping the pipe internally, using expanding jaws or by threading the pipe. In certain scenarios, a tube with cross holes can be slid over the duct, after which holes are drilled through the plastic pipe, and bolts or screws are employed to fasten it to the metal tube puller.

Additionally, in certain scenarios, a plastic duct installation may involve a multiple micro-duct bundle or a bundle of conduits. The bundle typically comprises more than one small (e.g., less than 25 mm in diameter), round ducts, referred to as micro-ducts, encased within a plastic sheath. For example, such bundles may include 2 or more conduits (e.g., ducts), which may vary in diameter. The diameters may range, e.g., from 10 to 14 mm.

The plastic sheath surrounding the duct bundle results in a non-circular exterior shape (e.g., which may be referred to as a non-circular cross section of the bundle). The shape may take various forms, such as triangular, square, or hexagonal, etc. However, the non-circular configuration may pose challenges when using wire mesh grip-style pullers, as the pullers may struggle to securely grip the exterior of the bundle of conduits. Furthermore, the wire mesh grips may only engage with the outer sheath of the pipe bundle, failing to distribute any load to the internal ducts.

Moreover, pullers designed to grip the inside of plastic pipes may not be compatible with multi micro-duct bundles or bundle conduits. The tight packing of the individual ducts within the bundle can make it difficult to use pullers intended to grip the ducts from the inside, as they may struggle to maneuver within such densely packed configurations.

Accordingly, embodiments of the present disclosure describe a secure method of attaching the pulling device and the bundle of conduits. In some cases, the pulling device is slid over the end of the bundle of conduits (or multiple micro-duct bundle). The non-circular cross-section of the interior pocket of the pulling device matches, and hence rotationally constrains, the pulling device to the bundle of conduits. Fasteners (such as screws) may be received at apertures present over the exterior surface of the pulling device and installed inside the pulling device using the bundle of conduits.

In some cases, the fasteners may be installed such that the fasteners may cut threads into and pass through the exterior sidewalls of at least a portion of the micro-ducts of the bundle of conduits. In some cases, the apertures in the pulling device can be located such that the fasteners intersect the exterior sidewalls of one or more of the individual micro-ducts of the bundle of conduits and pass approximately through the centers of the individual micro-ducts, or in other locations. Accordingly, use of fasteners in the apertures (as described herein) and the non-circular interior pocket of the pulling device constrains the device with respect to the bundle of conduits to provide a strong connection with the bundle of micro-ducts and/or individual micro-ducts.

An embodiment of the present disclosure describes a method that can be used to seal the micro-ducts. In some cases, the individual micro-ducts in the bundle of conduits may be sealed to prevent drilling fluid or other debris from entering the micro-ducts during the pullback process.

In some cases, after the HDD drill rig pulls the bundle of conduits through the bore hole, the pulling device may be removed from the bundle of conduits. The fasteners may be unthreaded from the pulling device and the bundle of conduits (having been attached to one another) and then removed from the pulling device and the bundle of conduits. Thus, the pulling device may be removed from the bundle of conduits after the bundle of conduits is pulled through the bore hole.

An embodiment of the present disclosure includes an insert or spacer that may be used to increase the versatility of a pulling device. In some cases, the spacer may be suitable for interposition between an interior of the pulling device and an exterior of the bundle of conduits. As such, the interior space of the spacer may be able to fit, while rotationally constraining, a bundle of conduits that is smaller than a bundle of conduits that may be engaged in the interior of the pulling device (e.g., without the spacer).

Accordingly, the present disclosure provides a pulling device used for pulling a bundle of conduits that includes non-circular multiple micro-ducts. In some cases, a non-circular shape of the interior pocket of the pulling device constrains the position of the bundle of conduits in the interior pocket of the pulling device. Additionally, a plurality of fasteners can be threaded into the individual micro-ducts of the bundle of conduits which may improve the pullback capacity of the pulling device. According to an embodiment, spacers may be used to adapt the pulling device for use with additional sizes and configurations of bundle of conduits.

Conduits may generally refer to any structure, pathway, or channel (e.g., used to carry various utilities or services). For instance, conduits may generally include pipes, channels, tubes, cables, plastic pipes, ducts, micro-ducts, telecommunication conduits, water supply conduits, and electrical conduits, among various other examples. In certain aspects of the present disclosure, some descriptions or embodiments may use some of the above terminology interchangeably, without limiting the scope of the present disclosure. For instance, certain examples may be described with reference to pipes or ducts, but may more generally apply to any conduit by analogy, without departing from the scope of the present disclosure. Embodiments of the present disclosure can be used in the context of infrastructure systems. For example, the pulling system based on the present disclosure pulls a bundle of conduits including multiple micro-ducts for underground installation using HDD. Details regarding the design of the pulling device are provided with reference to FIGS. 1-13. Details regarding the method of using the pulling device for pulling the bundle of conduits are provided with reference to FIGS. 14-15.

A Pulling Device

Embodiments of the present disclosure include a pulling device designed for a bundle of conduits. In some cases, the bundle of conduits may include multiple micro-duct bundles with a non-circular shaped exterior. According to an embodiment, the pulling device may be made of steel or other durable materials. A first end of the pulling device includes a pulling eye, a shackle, or other means to attach the device to the HDD drill string assembly for pulling back towards the HDD drill rig. A second end (i.e., opposite to the first end) of the pulling device includes an interior pocket or cavity designed to slide over the exterior of the bundle of conduits.

FIG. 1 shows an example of a pulling device 100 according to aspects of the present disclosure. The example shown includes pulling device 100 and bundle of conduits 130 (e.g., a bundle of one or more conduits 125).

An embodiment of the present disclosure describes a method of attaching the pulling device 100 and the bundle of conduits 130. In some cases, the pulling device 100 is slid over the end of the bundle of conduits 130 (or multiple micro-duct bundle). The non-circular cross-section of the interior pocket of the pulling device 100 rotationally constrains the pulling device 100 to the bundle of conduits 130. Fasteners 115 (or screws) may be received at the apertures 110 in the pulling device 100 and installed inside the pulling device 100 to attach the bundle of conduits 130. In some cases, the fasteners 115 may be installed such that the fasteners 115 may cut threads into and through the walls of each of the micro-ducts (e.g., micro-ducts 125) of the bundle of conduits 130.

In some cases, the apertures 110 in the pulling device 100 can be located such that the fasteners 115 intersect the exterior sidewalls of one or more of the individual micro-ducts (i.e., micro-duct 125) of the bundle of conduits 130 approximately through the centers of at least a portion of the individual micro-ducts 125, or in other locations. Additionally or alternatively, fasteners 115 such as bolts may be used to pass completely through the apertures 110 in the pulling device 100 and holes drilled in the periphery of the bundle of conduits 130. The bolts may be secured at the distal end with nuts.

Accordingly, use of fasteners 115 in the apertures 110 (as described herein) and the non-circular interior pocket of the pulling device 100 constrains the device with respect to the bundle of conduits 130 to provide a strong connection to the individual micro-ducts (i.e., micro-duct 125). In some cases, the strength of the connections may vary as a function of the forces applied to the bundle of conduits 130 as it may be pulled through the pilot bore. Therefore, the fasteners 115 may not be over-tightened which may strip the threads cut into the exterior sidewalls of micro-duct 125 of the bundle of conduits 130, which may be, for example, made of a plastic material.

In some cases, the pulling device 100 may be attached to the bundle of conduits 130 at an end of the pilot bore. For example, the pulling device 100 may be attached opposite an HDD drill rig used to drill the pilot bore. The pulling device 100, once attached to the bundle of conduits 130, may be pulled back through the pilot bore. In some cases, a reamer may be attached to an HDD drill string and then connected to a pulling eye 105 at one end of the pulling device 100 by a pulling head and swivel. For example, the swivel provides for the reamer to turn without turning the pulling device 100. The HDD drill string is then pulled back through the pilot hole by the HDD drill rig.

According to some aspects, the present disclosure provides a pulling device 100 including an interior pocket at a distal end to receive one end of the bundle of conduits 130, with at least a portion of the interior pocket having a non-circular profile, shaped to constrain a rotational orientation of the bundle of conduits 130 within the pulling device 100, where the interior pocket has one open end and one closed end. In some examples, pulling device 100 inserts one end of the bundle of conduits 130 into the interior pocket of the pulling device 100.

In some examples, pulling device 100 attaches the pulling device 100 to a pulling mechanism via a pulling eye 105 configured to allow the pulling device 100 to be pulled through a bore hole. In some examples, pulling device 100 pulls the pulling device 100 and the bundle of conduits 130 having been attached to the pulling mechanism through the bore hole using the pulling mechanism. In some aspects, the pulling device 100 further includes one or more apertures 110 extending from a perimeter surface of an exterior of the pulling device 100 to the interior pocket, the one or more apertures 110 being sized and located to receive a fastener 115 (or fasteners), where the one or more apertures 110 are at one or more angles between positive and negative 60 degrees from normal relative to a central axis of the pulling device 100. In some aspects, the pulling mechanism is a horizontal directional drilling rig.

In some aspects, the pulling device 100 includes (e.g., may be made of) steel. In some examples, pulling device 100 attaches the pulling device 100 to the bundle of conduits 130 by inserting the fastener 115 (or fasteners) through the one or more apertures 110 and into the conduits.

Pulling device 100 is an example of, or includes aspects of, the corresponding element described with reference to FIGS. 2-7, and 10-12. In one aspect, pulling device 100 includes pulling eye 105, aperture 110, and fastener 115. According to some aspects, pulling eye 105 is configured to provide for the pulling device 100 to be pulled through a bore hole. According to some aspects, pulling eye 105 forms a pulling eye 105 to provide for the pulling device 100 to be pulled through a borehole. Pulling eye 105 is an example of, or includes aspects of, the corresponding element described with reference to FIGS. 2, 3, 11, and 12.

In some aspects, one or more apertures 110 extend from an exterior of the pulling device 100 to the interior pocket, sized and located around a perimeter surface of the exterior of the pulling device 100 to receive a fastener 115 or fasteners 115, where the one or more apertures 110 are at one or more angles between positive and negative 60 degrees from normal relative to a central axis of the pulling device 100.

According to some aspects, aperture 110 creates one or more apertures 110 extending from a perimeter surface of an exterior of the pulling device 100 to the interior pocket, sized and located to receive a fastener 115 or fasteners. In some aspects, the one or more apertures 110 are at angles between positive and negative 60 degrees from normal relative to a central axis of the pulling device 100. In some aspects, the one or more apertures 110 are created counterbored to match heads of the fastener 115 or fasteners 115. Aperture 110 is an example of, or includes aspects of, the corresponding element described with reference to FIGS. 2, 7, 11, and 12.

According to some aspects, one or more fasteners 115 are inserted through the one or more apertures 110 and into and through the exterior of the bundle of conduits 130 to secure the bundle of conduits 130 within the interior pocket of the pulling device 100. According to some aspects, fastener 115 is or fasteners are screws. In some examples, fastener 115 is or fasteners are bolts and nuts. In some aspects, the fastener 115 or fasteners are high-strength self-tapping screws with a piloting drill point.

In some aspects, the fastener 115 or fasteners are wood screws, sheet metal screws, or cotter pins. Fastener 115 is an example of, or includes aspects of, the corresponding element described with reference to FIGS. 2, 4, and 10-12.

In some aspects, the bundle of conduits 130 includes a bundle of more than one small, round conduits contained within a plastic sheath 120. In some cases, the bundle of conduits includes a plurality of (or multiple) micro-duct pipes or plastic pipes. According to some aspects, bundle of conduits 130 seals ends of individual conduits of the bundle of conduits 130 to prevent entry of drilling fluid or other debris. In some aspects, sealing the ends includes wrapping an exterior of the bundle of conduits 130 with one or more layers of tape.

In some aspects (e.g., as described in more detail with reference to FIG. 9), bundle of conduits 130 may refer to both the grouping of multiple conduits 125 and a surrounding sheath 130. Bundle of conduits 130 is an example of, or includes aspects of, the corresponding element described with reference to FIGS. 2, and 11-13. In one aspect, bundle of conduits 130 includes micro-duct 125 (e.g., a plurality of micro-ducts). Micro-duct 125 is an example of, or includes aspects of, the corresponding element described with reference to FIG. 13.

Figure 2:
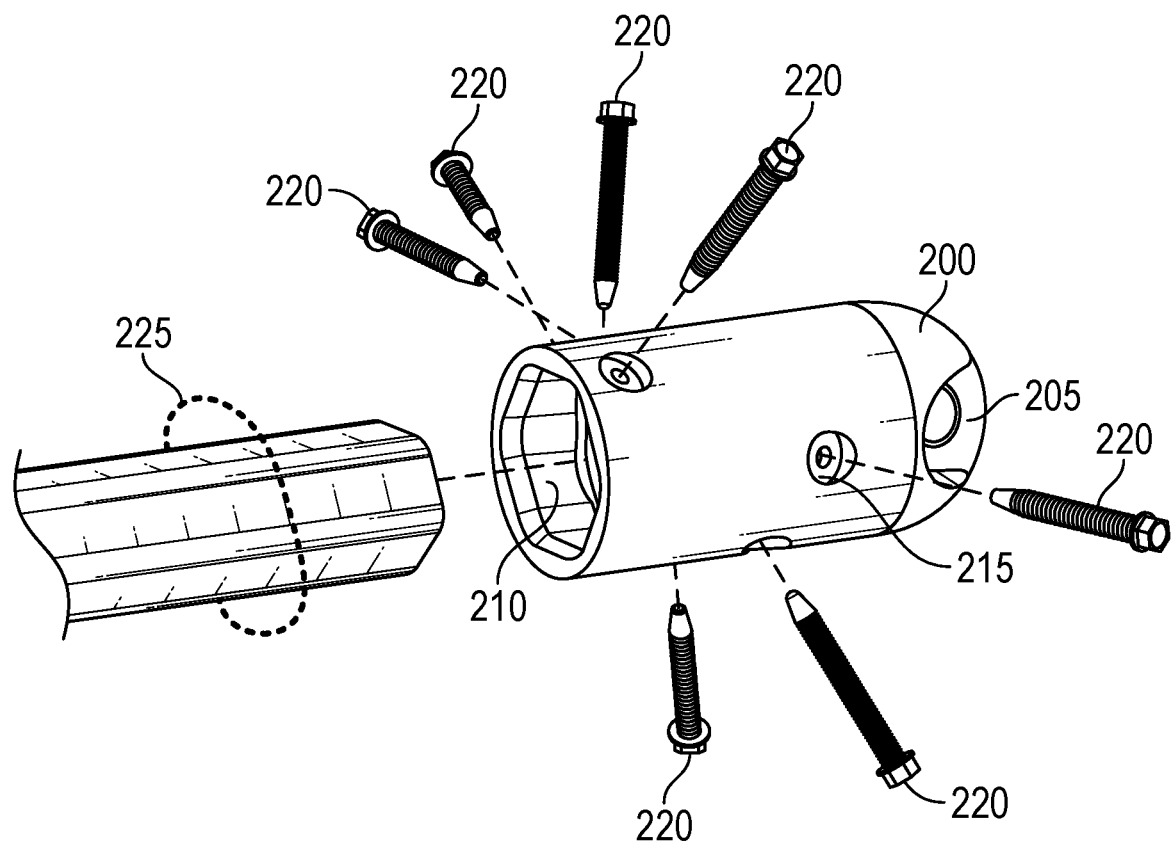
FIG. 2 shows an example of an exploded view of a pulling device, according to aspects of the present disclosure.

FIG. 2 shows an example of an exploded view of a pulling device 200 according to aspects of the present disclosure. The example shown includes pulling device 200 and bundle of conduits 225.

The present disclosure provides systems and methods of a pulling device used for pulling a bundle of conduits that includes multiple micro-ducts. In some examples, the interior pocket may include a non-circular shape. In some examples, the micro-ducts may include plastic pipes with a non-circular outer shape.

As shown in FIG. 2, the non-circular shape of the interior pocket 210 of the pulling device 200 constrains the position of the bundle of conduits 225 in the interior pocket 210 of the pulling device 200. In some aspects (e.g., as described in more detail with reference to FIGS. 1 and 9), bundle of conduits 225 may refer to both the grouping of multiple conduits and a surrounding sheath. In other words, according to different embodiments, the interior pocket 210 may be shaped to match the bundle of conduits 225 including the cross section (or exterior shape) of just a grouping of multiple conduits, or of a grouping of multiple conduits and a surrounding sheath.

In some cases, a plurality of fasteners 220 can be threaded into the individual micro-ducts of the bundle of conduits 225 which may improve the pullback capacity of the pulling device 200.

Additionally, FIG. 2 shows an example of an exploded view of a pulling device 200. The example shown includes a pulling device 200 with multiple metal fasteners 220 and a bundle of conduits 225 with multiple micro-ducts or plastic pipes.

Pulling device 200 is an example of, or includes aspects of, the corresponding element described with reference to FIGS. 1, 3-7, and 10-12. In one aspect, pulling device 200 includes pulling eye 205, interior pocket 210, aperture 215, and fastener 220. Pulling eye 205 is an example of, or includes aspects of, the corresponding element described with reference to FIGS. 1, 3, 11, and 12. Aperture 215 is an example of, or includes aspects of, the corresponding element described with reference to FIGS. 1, 7, 11, and 12. Fastener 220 is an example of, or includes aspects of, the corresponding element described with reference to FIGS. 1, 4, and 10-12.

According to some aspects, interior pocket 210 is at a distal end to receive one end of the bundle of conduits 225, with at least a portion of the interior pocket 210 having a non-circular profile, shaped to constrain a rotational orientation of the bundle of conduits 225 within the pulling device 200, wherein the interior pocket 210 has one open end and one closed end (as shown in FIG. 2). In some aspects, the non-circular profile of the interior pocket 210 is shaped to match at least a portion of a cross-section of the exterior of the bundle of conduits 225. Interior pocket 210 is an example of, or includes aspects of, the corresponding element described with reference to FIGS. 5, 6, 10, and 11. Bundle of conduits 225 is an example of, or includes aspects of, the corresponding element described with reference to FIGS. 1, and 11-13.

Figure 3:
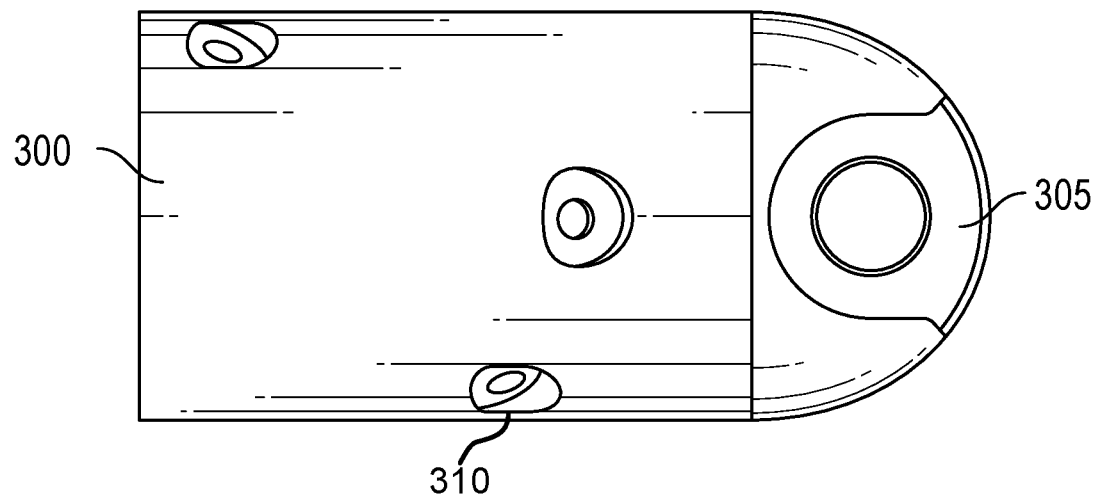
FIG. 3 shows an example of a top view of a pulling device, according to aspects of the present disclosure.

FIG. 3 shows an example of a top view of a pulling device 300 according to aspects of the present disclosure. FIG. 3 shows the overall profile of the pulling device 300, a pulling eye 305 (i.e., through-hole), and the angled and parallel apertures for attachment of fasteners (or screws) to the bundle of conduits.

Pulling device 300 is an example of, or includes aspects of, the corresponding element described with reference to FIGS. 1, 2, 4-7, and 10-12. In one aspect, pulling device 300 includes pulling eye 305. Pulling eye 305 is an example of, or includes aspects of, the corresponding element described with reference to FIGS. 1, 2, 11, and 12.

In some cases, a reamer may be attached to an HDD drill string and then connected to a pulling eye 305 at one end of the pulling device 300. For example, as shown in FIG. 3, an end of the pulling device 300 includes a pulling eye 305 to provide for the pulling device 300 to be pulled through a bore hole. Additionally, the pulling device 300 has multiple apertures 310 (or cross holes) extending from exterior surface of the pulling device 300 to the interior pocket. The apertures 310 are designed to accept fasteners (e.g., screws) as described with reference to FIGS. 1-2.

In some cases, apertures 310 may be counterbored to match the fasteners (e.g., heads of the screws). According to an exemplary embodiment, one or more fasteners may be used. In some examples, the fasteners may be high-strength self-tapping screws. In some cases, the self-tapping screws may include a piloting drill point. However, embodiments are not limited thereto, and other types of fasteners, including wood screws, sheet metal screws, bolts, cotter pins, etc. may be used.

Figure 4:
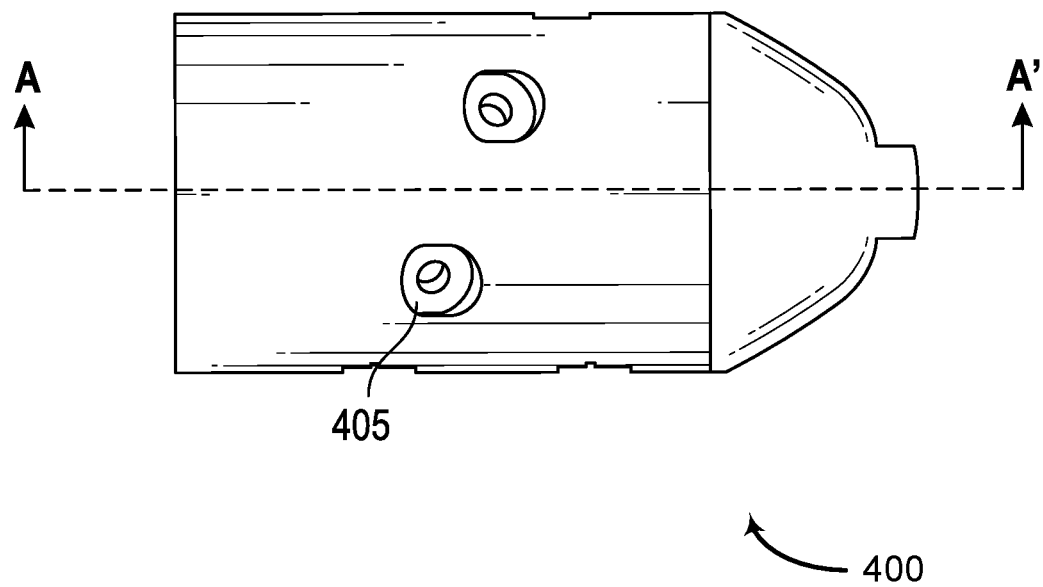
FIG. 4 shows an example of a side view of a pulling device, according to aspects of the present disclosure.

FIG. 4 shows an example of a side view of a pulling device 400 according to aspects of the present disclosure. FIG. 4 shows the overall profile of the pulling device 400 including angled and parallel apertures (such as aperture 405) for attachment of fasteners (or screws) to the bundle of conduits. In some cases, the bundle of conduits includes a plurality of (or multiple) micro-duct pipes or plastic pipes.

As shown in FIG. 4, the pulling device 400 has multiple apertures (such as aperture 405) (or cross holes) extending on the exterior surface of the pulling device 400. For example, in some cases, the apertures may be extending at angles between plus and minus 60 degrees (i.e., ±60°) from the central axis of the pulling device 400. The apertures are designed to accept fasteners (e.g., screws) and may be counterbored to match the fasteners (e.g., heads of the screws).

Figure 5:
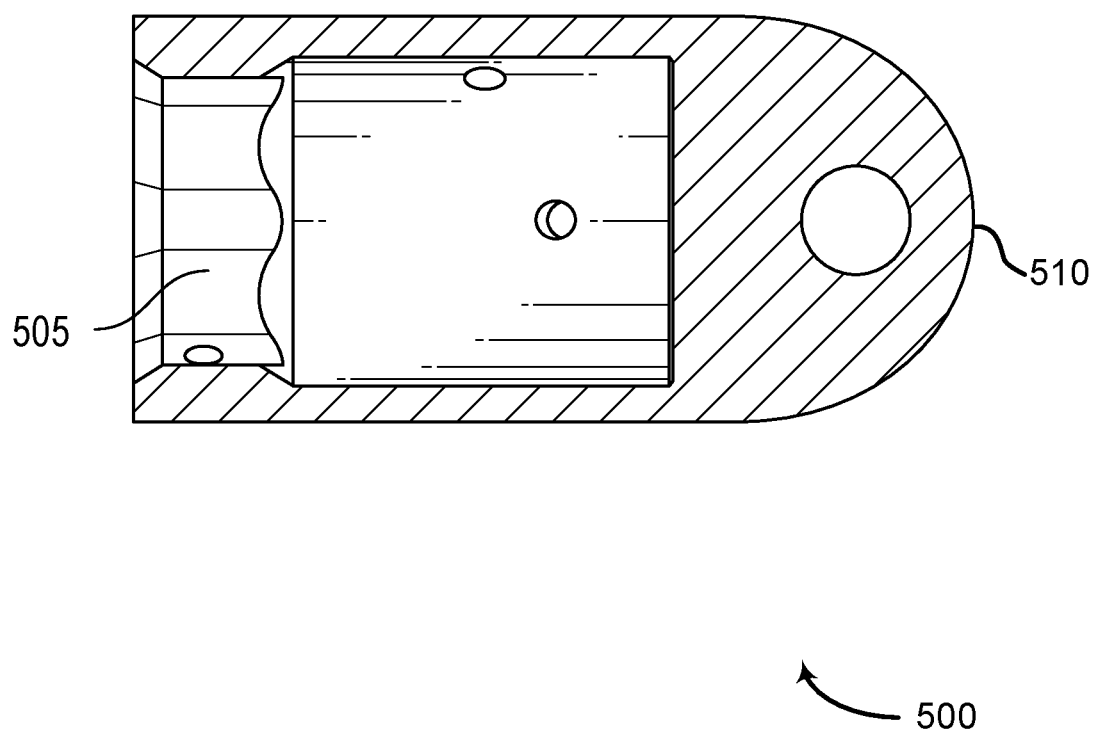
FIG. 5 shows an example of a sectional side view of a pulling device, according to aspects of the present disclosure.

Pulling device 400 is an example of, or includes aspects of, the corresponding element described with reference to FIGS. 1-3, 5-7, and 10-12. In one aspect, pulling device 400 includes fastener 405. Fastener 405 is an example of, or includes aspects of, the corresponding element described with reference to FIGS. 1, 2, and 10-12. FIG. 5 shows an example of a sectional side view of a pulling device 500 according to aspects of the present disclosure. FIG. 5 shows an internal profile of the pulling device 500. For example, the profile in FIG. 5 corresponds to a side sectional view taken along the line AA' of FIG. 4 on a scale of 1:2. As shown in FIG. 5, an internal profile of the pulling device 500 is illustrated that enables attachment with bundle of conduits.

Pulling device 500 is an example of, or includes aspects of, the corresponding element described with reference to FIGS. 1-4, 6, 7, and 10-12. In one aspect, pulling device 500 includes interior pocket 505. Interior pocket 505 is an example of, or includes aspects of, the corresponding element described with reference to FIGS. 2, 6, 10, and 11.

Embodiments of the present disclosure include a pulling device 500 with an interior pocket 505 of which at least a portion is non-circular in shape to match at least a portion of the exterior shape of bundle of conduits (i.e., micro-duct bundle). A first end of the pulling device 500 includes a pulling eye 510, a shackle, or other means to attach the device to the HDD drill string assembly for pulling back towards the HDD drill rig.

A second end (i.e., opposite to the first end) of the pulling device 500 includes an interior pocket 505 or cavity designed to slide over the exterior of the bundle of conduits. In some cases, the non-circular shaped portion of the interior pocket 505 rotationally orients the pulling device 500 such that fasteners (i.e., screws) driven through the pulling device 500 intersect at least a portion of the individual conduits. For example, the interior walls of the interior pocket 505 may be made to engage with, e.g., match, at least a portion of the cross-section of the exterior shape of the bundle of conduits.

In some examples, a cross-section of a portion of the interior pocket 505 in the pulling device 500 may be a non-circularly-packed shape and slightly larger than the cross-section of the bundle of conduits. A profile of the interior pocket 505 may outline multiple geometric shapes. Further details regarding the shapes of the interior pocket are provided with reference to FIG. 8.

Figure 6:
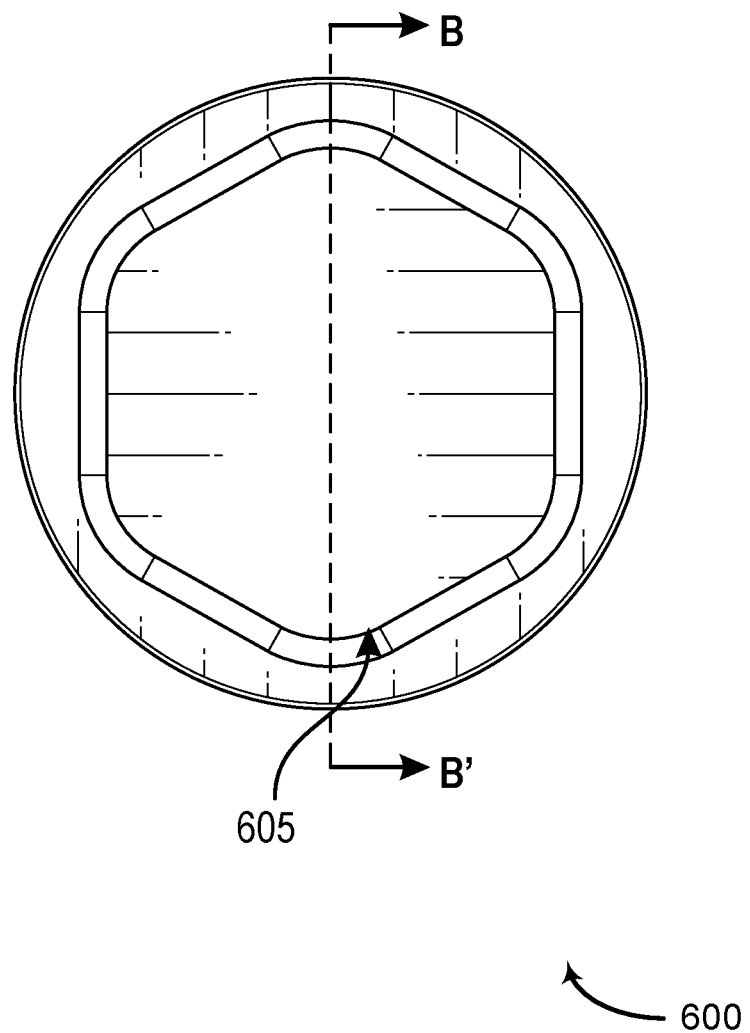
FIG. 6 shows an example of a rear view of a pulling device, according to aspects of the present disclosure.

FIG. 6 shows an example of a rear view of a pulling device 600 according to aspects of the present disclosure.

FIG. 6 shows an internal profile of the pulling device 600. For example, FIG. 6 illustrates a shape of an interior pocket 605 of the pulling device 600. Further details regarding FIG. 6 are provided with reference to FIG. 7 which shows a section of FIG. 6 along line BB'.

Pulling device 600 is an example of, or includes aspects of, the corresponding element described with reference to FIGS. 1-5, 7, and 10-12. In one aspect, pulling device 600 includes interior pocket 605. Interior pocket 605 is an example of, or includes aspects of, the corresponding element described with reference to FIGS. 2, 5, 10, and 11.

In some cases, at least a portion of the interior walls of the interior pocket 605 have a non-circular cross-sectional shape. The interior walls of the interior pocket 605 may be made to engage with, e.g., match, at least a portion of the cross-section of the exterior shape of the bundle of conduits including multiple micro-ducts. In some examples, as shown in FIG. 6, the cross-section of a portion of the interior pocket 605 in the pulling device 600 may be a hexagonal circularly-packed shape or a hexagon shape and slightly larger than the cross-section of the bundle of conduits.

Figure 7:
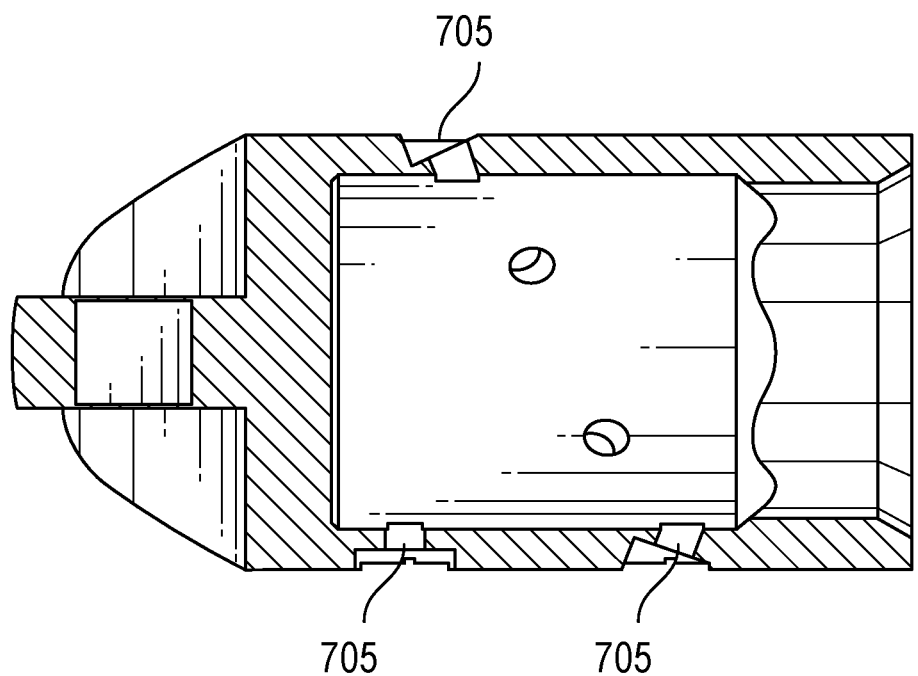
FIG. 7 shows an example of a cross sectional view of a pulling device, according to aspects of the present disclosure.

FIG. 7 shows an example of a cross sectional view of a pulling device 700 according to aspects of the present disclosure. FIG. 7 shows an internal profile of the pulling device 700. For example, FIG. 7 depicts a section along line BB' of FIG. 6 on a scale of 1:2.

Pulling device 700 is an example of, or includes aspects of, the corresponding element described with reference to FIGS. 1-6, and 10-12. In one aspect, pulling device 700 includes aperture 705. Aperture 705 is an example of, or includes aspects of, the corresponding element described with reference to FIGS. 1, 2, 11, and 12.

As seen in FIG. 7, a plurality of apertures (e.g., aperture 705) are present on the pulling device 700. In some cases, the apertures 705 may extend from the exterior of the pulling device 700 to a surface of the interior pocket. For example, the apertures 705 (also referred to as cross holes) may be at angles between plus and minus 60 degrees (i.e., ±60°) from the central axis of the pulling device 700. The apertures 705 are designed to accept fasteners (e.g., screws) and may be counterbored to match the fasteners (e.g., heads of the screws).

Figure 8:
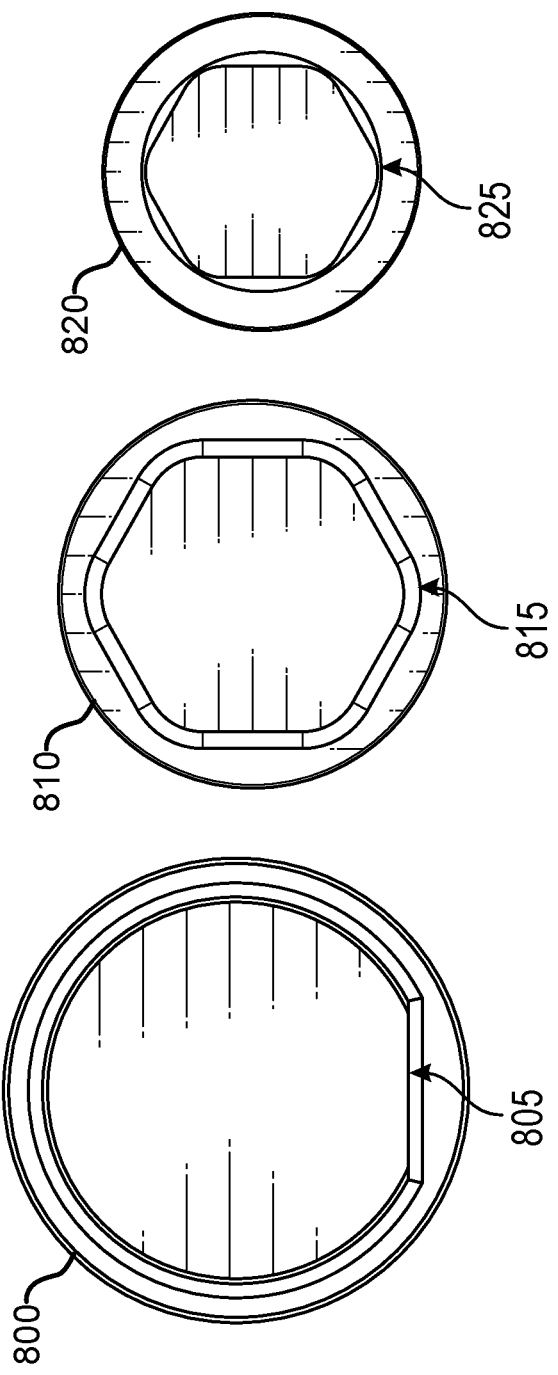
FIG. 8 shows an example of a rear profile of a pulling device, according to aspects of the present disclosure.

FIG. 8 shows an example of a rear profile of a pulling device according to aspects of the present disclosure. The example shown includes first pulling device 800, second pulling device 810, and third pulling device 820.

As shown in FIG. 8, each of the three examples show an internal profile of the pulling device. Accordingly, in one aspect, first pulling device 800 includes first interior pocket 805, second pulling device 810 includes second interior pocket 815, and third pulling device 820 includes third interior pocket 825.

In some cases, the internal profile comprising the internal pocket (i.e., first interior pocket 805, second interior pocket 815, and third interior pocket 825) of the pulling device (i.e., first pulling device 800, second pulling device 810, and third pulling device 820, respectively) enables attachment with bundles of conduits. A bundle of conduits having multiple (i.e., different) shapes and sizes may be attached to the pulling devices shown in FIG. 8. For example, sizes of the bundle of conduits may be affected by the shape and size of the pipes included in the bundle (e.g., micro-duct pipes or plastic pipes).

FIG. 8 shows a non-circular interior pocket of the pulling device. In some cases, the bundle of conduits (i.e., including multiple micro-duct or plastic pipes) enters and may be seated in the interior pocket (e.g., any of the first interior pocket 805, second interior pocket 815, or third interior pocket 825). As shown with reference to FIG. 8, a profile of the non-circular interior pocket in the pulling device may outline multiple geometric shapes, as illustrated with reference to first pulling device 800, second pulling device 810, and third pulling device 820.

The profiles of the interior pocket may include different forms such as a plurality of sides and/or feature shapes and/or only one side feature/shape on a circular or non-circular profile, etc. For example, the interior pockets, as shown in FIG. 8, may be able to accommodate bundles of conduits that may include different numbers of micro-ducts of circular (or non-circular) cross-sections (e.g., having equal diameter) in a non-circularly-packed shape. As a result, the cross-section of a portion of the interior pocket in the pulling device may vary based on the number of micro-ducts.

In some cases, the cross-section of a portion of the interior pocket in the pulling device may be slightly larger than the cross-section of the bundle of conduits. Accordingly, the pulling device can slide over the bundle of conduits and may be constrained rotationally (as desired). Further details regarding micro-ducts in the bundle of conduits and the size variations of the bundle of conduits are described with reference to FIGS. 9 and 13.

Figure 9:
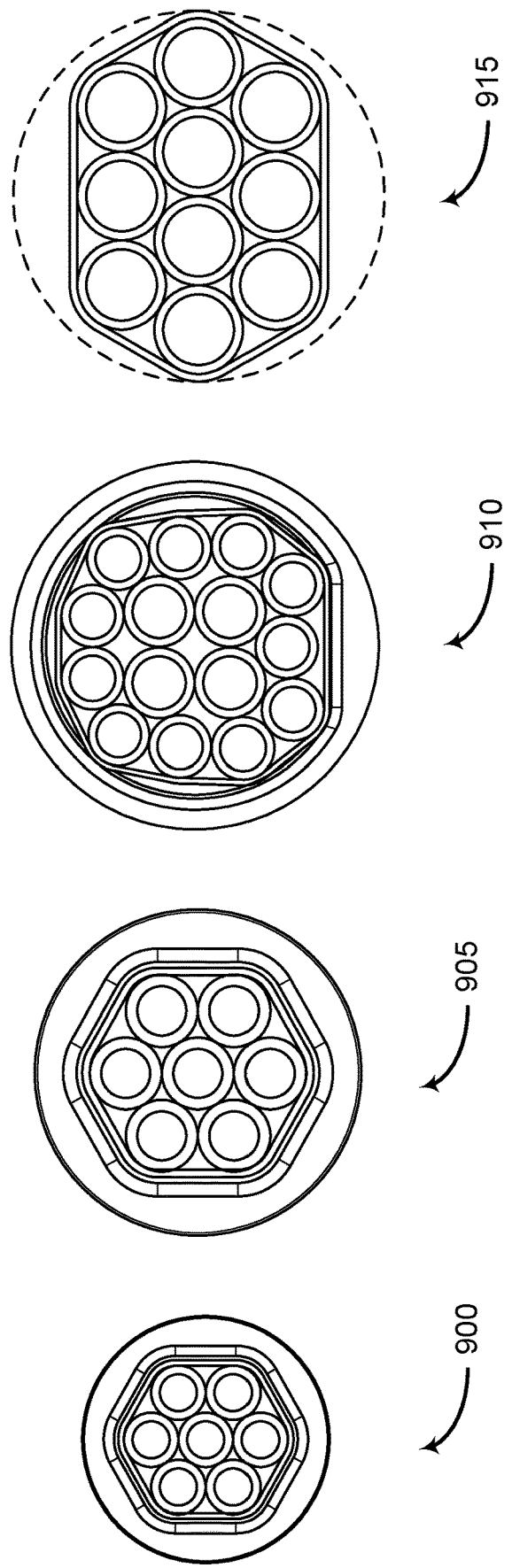
FIG. 9 shows an example of a configuration of a bundle of conduits, according to aspects of the present disclosure.

FIG. 9 shows an example of a configuration of a bundle of conduits according to aspects of the present disclosure. The example shows a variety of bundles of conduits (e.g., multiple micro-duct bundle profiles) including first bundle of conduits 900, second bundle of conduits 905, third bundle of conduits 910, and fourth bundle of conduits 915. In each example variety, the bundle is shown positioned inside a pulling device such as described elsewhere herein as it would be positioned in practice.

Referring to FIG. 9, a plurality of conduit bundle configurations (e.g., for the micro-duct pipes or plastic pipes) are illustrated. As shown in FIG. 9, the bundles of conduits may differ in shape/size based on the sizes and shapes of the individual conduits (e.g., the size/shape of each of the multiple micro-duct pipes or plastic pipes) included in the bundle. In some cases, the bundles of conduits may differ in shape/size based on the sizes and shapes of a sheath surrounding the bundle of conduits. For example, each of the bundle of conduits (first bundle of conduits 900, second bundle of conduits 905, third bundle of conduits 910, and fourth bundle of conduits 915) illustrate different numbers and arrangement of micro-duct pipes resulting in different sizes and shapes of the bundle of conduits.

For example, as shown in FIG. 9, in some cases, the bundle of conduits (such as first bundle of conduits 900 and second bundle of conduits 905) may each include seven micro-ducts of circular cross-section having equal diameter in a hexagonal circularly-packed shape. As a result, the cross-section of a portion of the interior pocket in the pulling device may be a hexagonal circularly-packed shape or a hexagon shape. As shown in FIG. 9, the first bundle of conduits 900 and second bundle of conduits 905 include micro-duct pipes of different sizes. For example, the micro-ducts in the first bundle of conduits 900 may be smaller (e.g., in diameter) than the micro-ducts in the second bundle of conduits 905. Accordingly, the first bundle of conduits 900 is smaller than the second bundle of conduits 905.

Additionally, for example, the third bundle of conduits 910 includes 15 micro-ducts and the fourth bundle of conduits 915 includes 10 micro-ducts. In some cases, as shown in FIG. 9, the micro-ducts may be contained within an outer sheath (e.g., plastic sheath). However, embodiments are not limited thereto and another suitable material may be used for the outer sheath. The outer sheath around the duct bundle creates a non-circular exterior (such as approximately triangular, hexagonal, trapezoidal, etc. in shape). Additionally, in some cases, the interior pocket of the pulling device may be slightly larger than the cross-section of the bundle of conduits. Therefore, the pulling device can slide over the bundle of conduits and may be constrained rotationally (as desired).

Figure 10:
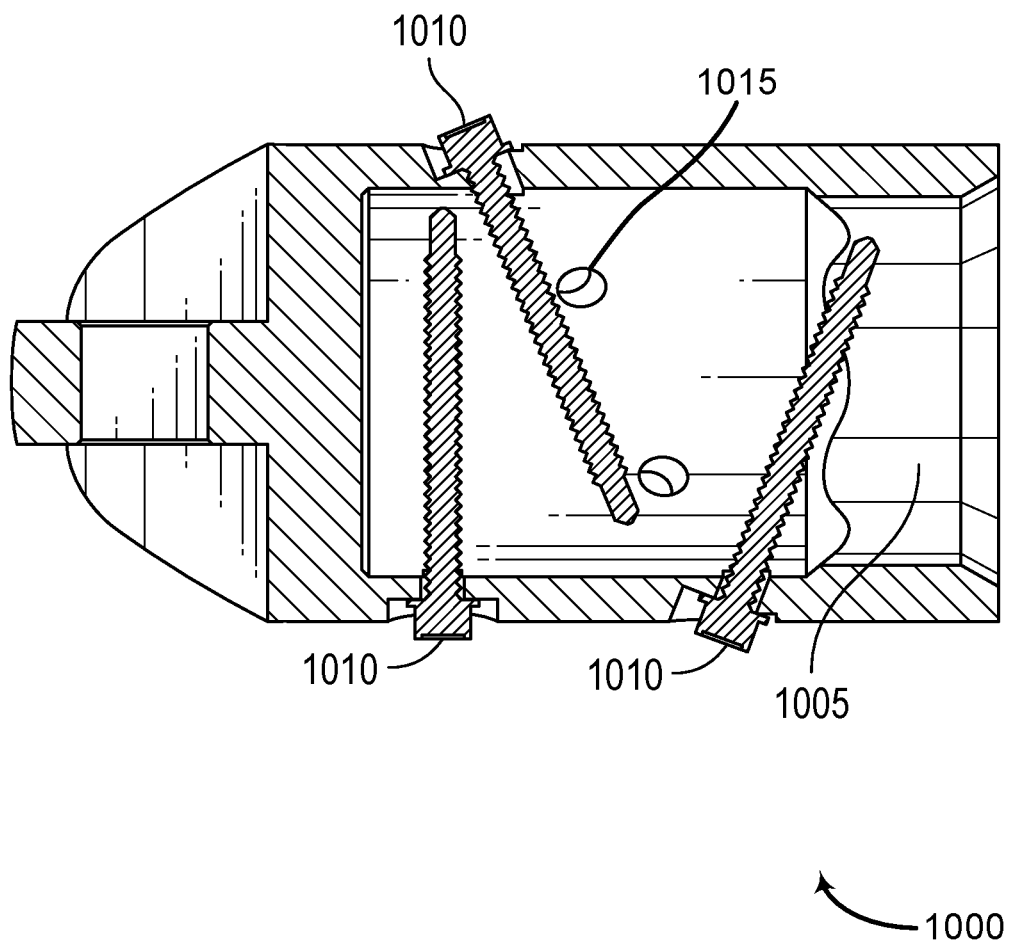
FIG. 10 shows an example of a side sectional view of a pulling device, according to aspects of the present disclosure.

FIG. 10 shows an example of a side sectional view of a pulling device 1000 according to aspects of the present disclosure. Pulling device 1000 is an example of, or includes aspects of, the corresponding element described with reference to FIGS. 1-7, 11, and 12. In one aspect, pulling device 1000 includes interior pocket 1005 and fastener 1010. Interior pocket 1005 is an example of, or includes aspects of, the corresponding element described with reference to FIGS. 2, 5, 6, and 11. Fastener 1010 is an example of, or includes aspects of, the corresponding element described with reference to FIGS. 1, 2, 4, 11, and 12.

In some cases, the bundle of conduits is fastened to the pulling device 1000 using the plurality of fasteners 1010. Referring together to FIGS. 7 and 9, multiple apertures (such as aperture 1015) are present in the pulling device 1000. In some cases, apertures are strategically placed for fastening the bundle of conduits. For example, a plurality of fasteners 1010 (such as, but not limited to, screws) may be used to attach the bundle of conduits (comprising multiple microduct or plastic pipes) to the pulling device 1000.

In some embodiments, the angled apertures (e.g., aperture 1015) may be counterbored, countersunk, or may be as a through hole. In some cases, the apertures 1015 may be located to ensure appropriate screw engagement between the pulling device 1000 and the bundle of conduits. Accordingly, for example, once the bundle of conduits is inserted into the pulling device 1000, the bundle of conduits may be fastened by means of fasteners such as metal screws. However, embodiments are not limited thereto and other types of fasteners, including wood screws, sheet metal screws, bolts, cotter pins, etc. may be used.

Figure 11:
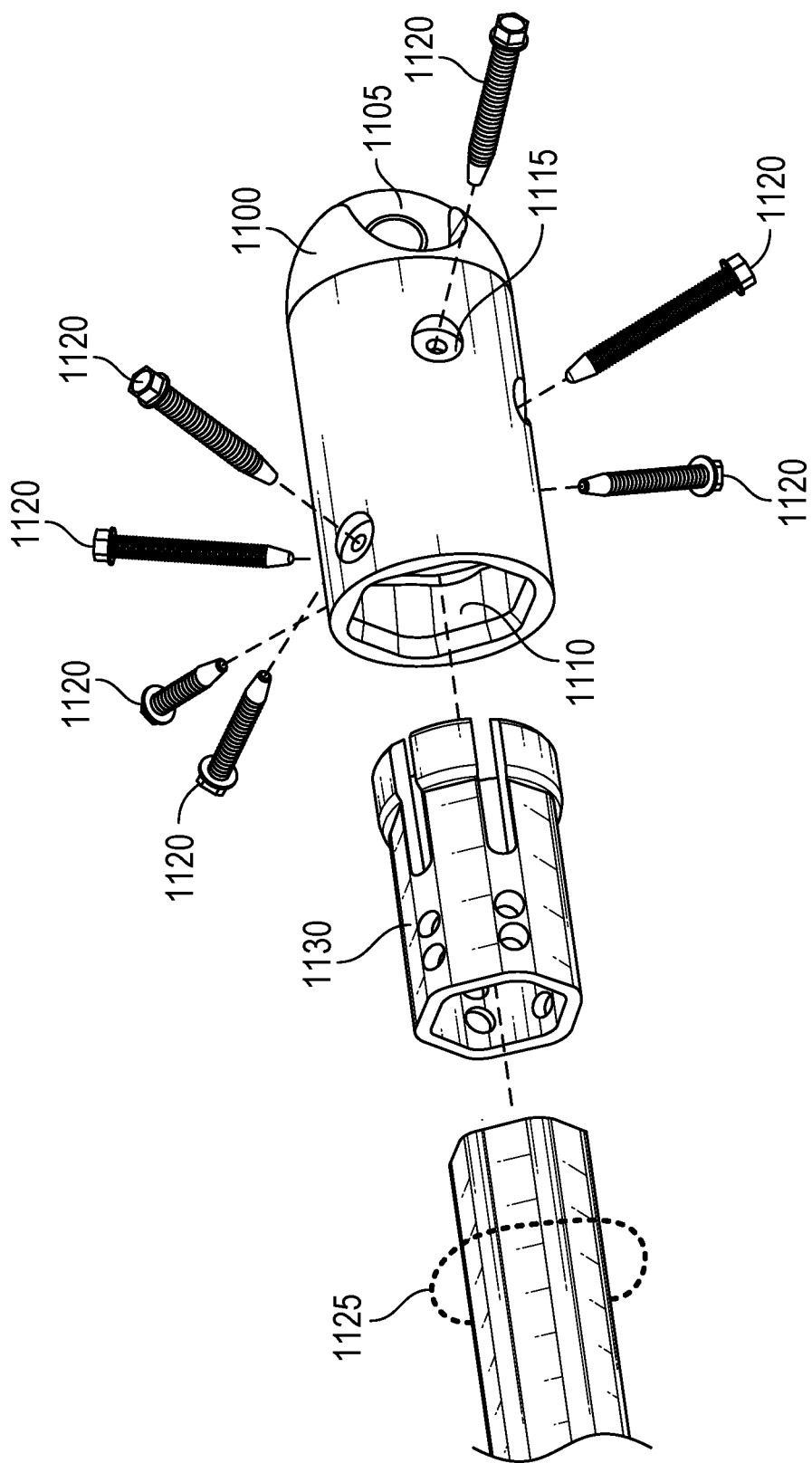
FIG. 11 shows an example of an exploded view of a pulling device with a spacer, according to aspects of the present disclosure.

FIG. 11 shows an example of an exploded view of a pulling device 1100 according to aspects of the present disclosure. The example shown includes pulling device 1100, bundle of conduits 1125, and spacer 1130.

Pulling device 1100 is an example of, or includes aspects of, the corresponding element described with reference to FIGS. 1-7, 10, and 12. In one aspect, pulling device 1100 includes pulling eye 1105, interior pocket 1110, aperture 1115, and fastener 1120. Pulling eye 1105 is an example of, or includes aspects of, the corresponding element described with reference to FIGS. 1-3, and 12. Interior pocket 1110 is an example of, or includes aspects of, the corresponding element described with reference to FIGS. 2, 5, 6, and 10. Aperture 1115 is an example of, or includes aspects of, the corresponding element described with reference to FIGS. 1, 2, 7, and 12. Fastener 1120 is an example of, or includes aspects of, the corresponding element described with reference to FIGS. 1, 2, 4, 10, and 12. Bundle of conduits 1125 is an example of, or includes aspects of, the corresponding element described with reference to FIGS. 1, 2, 12, and 13.

According to one or more embodiments, an insert or spacer 1130 may be used with the pulling device 1100. In some cases, an insert or spacer 1130 may be used to increase the versatility of a pulling device 1100. The spacer 1130 may be sized and shaped to fit a cavity inside the pulling device 1100 such that the spacer 1130 may be rotationally constrained. In some cases, the spacer 1130 may be suitable for interposition between an interior of the pulling device 1100 and an exterior of the bundle of conduits 1125. For example, the spacer 1130 may include various materials such as plastic, fiberglass, carbon fiber, wood, and metal.

According to an example, an exterior shape of the spacer 1130 may be the same as an interior shape of the spacer 1130. Additionally or alternatively, the exterior shape of the spacer 1130 may be different from the interior shape of the spacer 1130. The external shape of the spacer 1130 may adapt to the non-circular interior pocket 1110 of a (e.g., large) pulling device 1100. As used herein, a large pulling device may refer to a pulling device with an interior pocket that has a larger diameter than the external diameter of the bundle of conduits such that a rotational orientation of the bundle of conduits is not constrained.

Additionally or alternatively, the internal shape of the spacer 1130 adapts to the form of the non-circular profile of the accepting pipe. Accordingly, spacer 1130 may be used to adapt pulling device 1100 to be used with additional sizes and configurations of bundle of conduits 1125. In some cases, the spacer 1130 may be attached and removed as desired.

In some aspects, the insert or spacer 1130 includes one or more holes, slots, or other apertures 1115 that align with the one or more apertures 1115 in the pulling device 1100. According to some aspects, a spacer 1130 is inserted into the interior pocket 1110 of the pulling device 1100 before inserting the bundle of conduits 1125, the spacer 1130 being configured to adapt the pulling device 1100 to receive the bundle of conduits 1125. In some aspects, the spacer 1130 includes one or more apertures 1115 that align with the one or more apertures 1115 of the pulling device 1100. Spacer 1130 is an example of, or includes aspects of, the corresponding element described with reference to FIG. 12.

Figure 12:
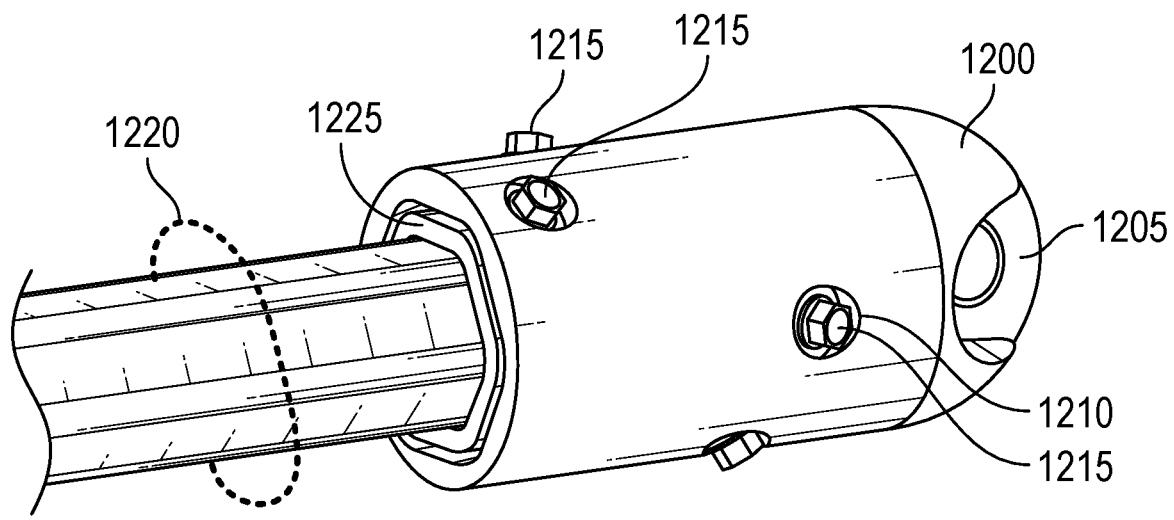
FIG. 12 shows an example of a pulling device with a spacer, according to aspects of the present disclosure.

FIG. 12 shows an example of a pulling device 1200 with a spacer 1225 according to aspects of the present disclosure. The example shown includes pulling device 1200, bundle of conduits 1220, and spacer 1225.

Pulling device 1200 is an example of, or includes aspects of, the corresponding element described with reference to FIGS. 1-7, 10, and 11. In one aspect, pulling device 1200 includes pulling eye 1205, aperture 1210, and fastener 1215. Pulling eye 1205 is an example of, or includes aspects of, the corresponding element described with reference to FIGS. 1-3, and 11. Aperture 1210 is an example of, or includes aspects of, the corresponding element described with reference to FIGS. 1, 2, 7, and 11. Fastener 1215 is an example of, or includes aspects of, the corresponding element described with reference to FIGS. 1, 2, 4, 10, and 11. Bundle of conduits 1220 is an example of, or includes aspects of, the corresponding element described with reference to FIGS. 1, 2, 11, and 13.

As shown in FIG. 12, an insert or spacer 1225 may be inserted into the pulling device 1200 to enable bundle of conduits 1220 having different sizes and shapes to be accepted by (e.g., fastened to) the pulling device 1200. The spacer 1225 may compress when being inserted into the pulling device 1200 which ensures a snug fit when seated into the pulling device 1200. According to an embodiment, the spacer 1225 includes apertures that align with the apertures 1210 of pulling device 1200 for attachment to the pulling device 1200 into the bundle of conduits 1220 with multiple micro-ducts or plastic pipes.

As shown in FIG. 12, the spacer 1225 may be suitable for interposition between an interior of the pulling device 1200 and an exterior of the bundle of conduits 1220. In some examples, at least a portion of the interior space formed by the spacer 1225 may include a non-circular cross-section. Accordingly, the interior space of the spacer 1225 may be able to fit (e.g., while rotationally constraining) a bundle of conduits 1220 that is smaller than a bundle of conduits 1220 that may otherwise be engaged in the interior of the pulling device 1200 (e.g., without the spacer 1225). According to an embodiment, spacers 1225 may be used to adapt the pulling device 1200 for use with additional sizes and configurations of bundle of conduits 1220. Spacer 1225 is an example of, or includes aspects of, the corresponding element described with reference to FIG. 11.

Figure 13:
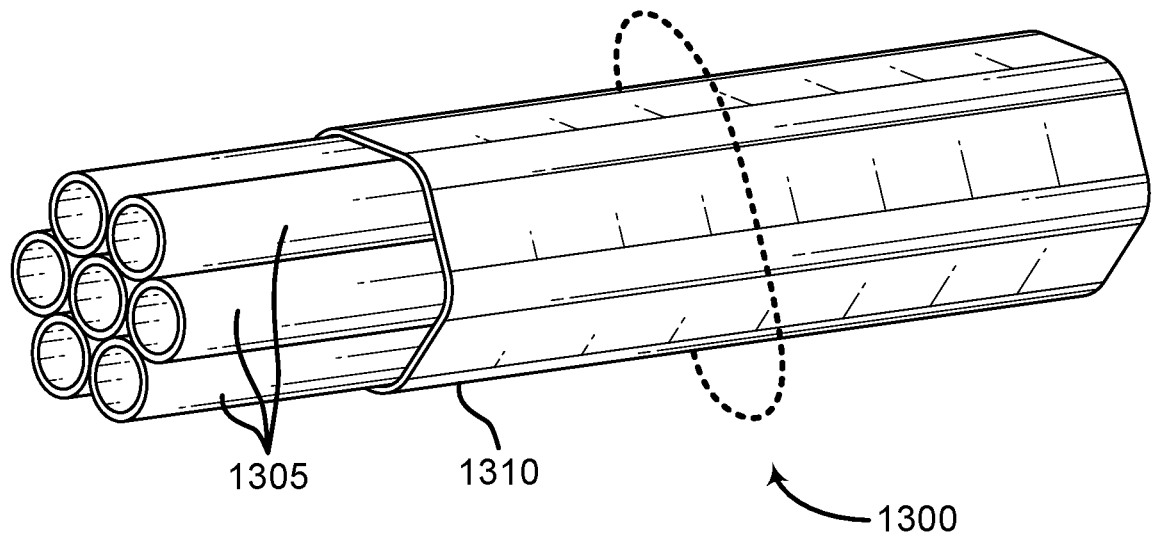
FIG. 13 shows an example of a bundle of conduits, according to aspects of the present disclosure.

FIG. 13 shows an example of a bundle of conduits 1300 according to aspects of the present disclosure. Bundle of conduits 1300 is an example of, or includes aspects of, the corresponding element described with reference to FIGS. 1, 2, 11, and 12. In one aspect, bundle of conduits 1300 includes multiple (e.g., seven) micro-ducts 1305. Micro-duct 1305 is an example of, or includes aspects of, the corresponding element described with reference to FIG. 1.

Referring to FIG. 13, a bundle of conduits 1300 is shown that includes a plurality of micro-ducts 1305 (and in some cases a sheath 1310). For example, the bundles of conduits include multiple (i.e., different) shapes and sizes. In some examples, the shape and size of the bundle of conduits 1300 may be affected by the shape and size of the individual conduits 1305 and/or the shape and size of the surrounding sheath 1310).

An embodiment of the present disclosure describes a method that can be used to seal the micro-ducts 1305. In some cases, the micro-ducts 1305 may be sealed to prevent drilling fluid or other debris from entering the micro-ducts 1305 of the bundle of conduits 1300 during the pullback. A first sealing method may include wrapping the exterior of the bundle of conduits 1300 with one or more layers of tape which creates a tight fit to the interior of the pulling device. A second sealing method may install plugs into the ends of the individual micro-ducts 1305. Additionally, a third sealing method may include taping the ends of the individual micro-ducts 1305 of the bundle of conduits 1300 to seal the ends of the individual micro-ducts 1305.

Accordingly, an apparatus for multiple micro-duct pulling system is described. One or more aspects of the apparatus include an interior pocket at a distal end to receive one end of the bundle of conduits, with at least a portion of the interior pocket having a non-circular profile, shaped to constrain a rotational orientation of the bundle of conduits within the pulling device, wherein the interior pocket has one open end and one closed end; a pulling eye configured to allow the pulling device to be pulled through a bore hole; and one or more apertures extend from an exterior of the pulling device to the interior pocket, sized and located around a perimeter surface of the exterior the pulling device to receive a fastener or fasteners, where the one or more apertures are at one or more angles between positive and negative 60 degrees from normal relative to a central axis of the pulling device.

Some examples of the apparatus and system further include one or more fasteners that are screws. Some examples of the apparatus, system, and method further include one or more fasteners that are bolts and nuts.

Some examples of the apparatus and system further include an insert or spacer configured to adapt the pulling device to multiple conduit bundle sizes and shapes. In some aspects, the insert or spacer comprises one or more holes, slots, or other apertures that align with the one or more apertures in the pulling device. In some aspects, the pulling device comprises steel.

In some aspects, the non-circular profile of the interior pocket is shaped to match at least a portion of a cross-section of the exterior of the bundle of conduits. In some aspects, the bundle of conduits comprises a bundle of more than one small, round conduits contained within a plastic sheath.

A Method of Pulling the Bundle of Conduits

A method for multiple micro-ducts pulling system is described. One or more aspects of the method include providing a pulling device comprising an interior pocket at a distal end to receive one end of the bundle of conduits, with at least a portion of the interior pocket having a non-circular profile, shaped to constrain a rotational orientation of the bundle of conduits within the pulling device, wherein the interior pocket has one open end and one closed end; inserting one end of the bundle of conduits into the interior pocket of the pulling device; attaching the pulling device to a pulling mechanism via a pulling eye configured to allow the pulling device to be pulled through a bore hole; and pulling the pulling device and the bundle of conduits having been attached to the pulling mechanism through the bore hole using the pulling mechanism. In some aspects, the pulling device further comprises one or more apertures extending from a perimeter surface of an exterior of the pulling device to the interior pocket, the one or more apertures being sized and located to receive a fastener or fasteners, wherein the one or more apertures are at one or more angles between positive and negative 60 degrees from normal relative to a central axis of the pulling device.

Some examples of the method further include inserting one or more fasteners through the one or more apertures and into the bundle of conduits to secure the bundle of conduits within the interior pocket of the pulling device. In some aspects, the fastener or fasteners are screws. In some aspects, the fastener or fasteners are bolts and nuts.

Some examples of the method further include inserting a spacer into the interior pocket of the pulling device before inserting the bundle of conduits, the spacer being configured to adapt the pulling device to receive the bundle of conduits. In some aspects, the spacer comprises one or more apertures that align with the one or more apertures of the pulling device. In some aspects, the pulling mechanism is a horizontal directional drilling rig.

Some examples of the method further include sealing ends of individual conduits of the bundle of conduits to prevent entry of drilling fluid or other debris. In some aspects, sealing the ends comprises wrapping an exterior of the bundle of conduits with one or more layers of tape.

Figure 14:
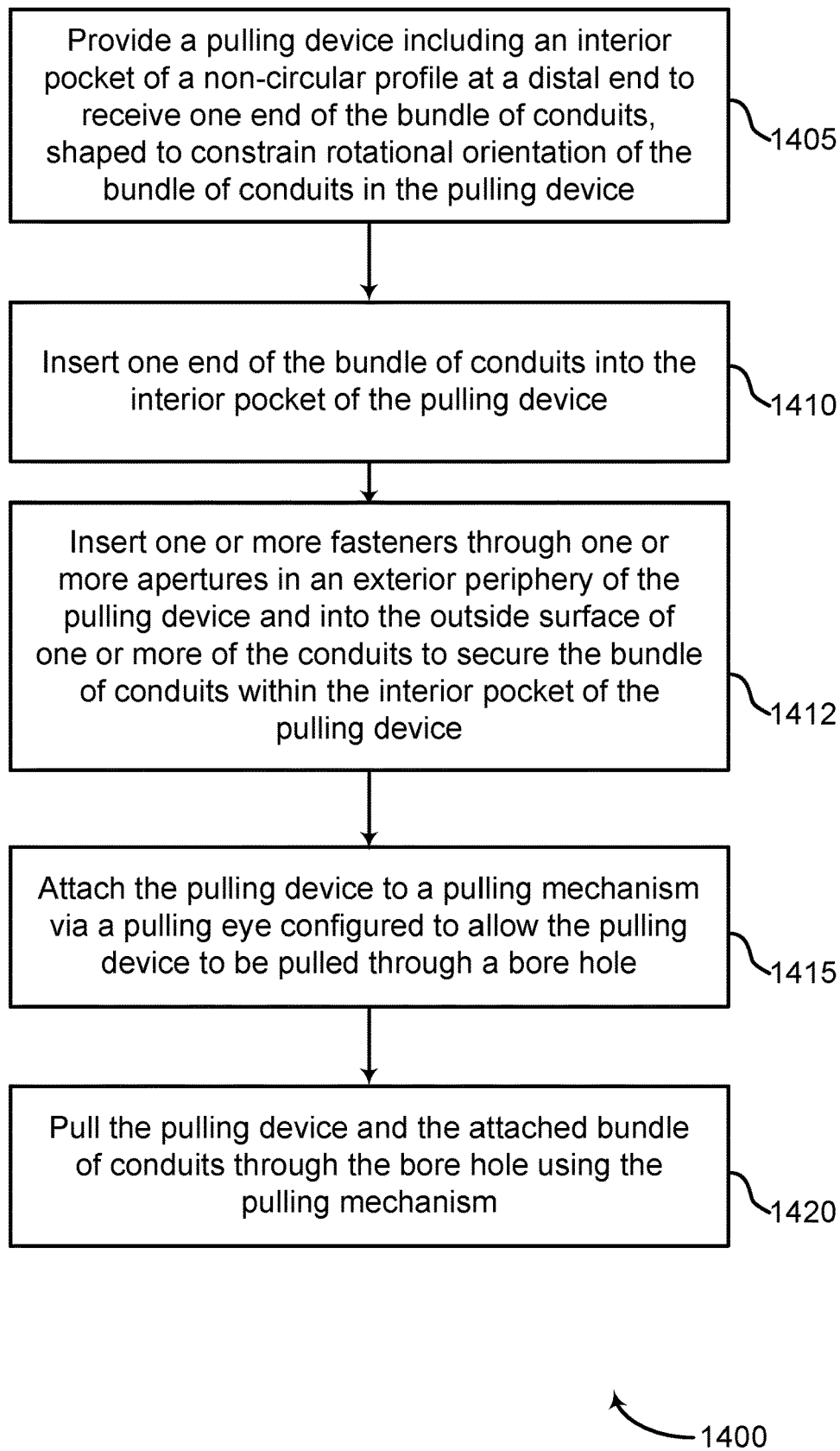
FIG. 14 shows an example of a method for pulling a bundle of conduits, according to aspects of the present disclosure

FIG. 14 shows an example of a method 1400 for infrastructure systems according to aspects of the present disclosure. In some examples, these operations are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the method provides a pulling device including an interior pocket at a distal end to receive one end of the bundle of conduits, with at least a portion of the interior pocket having a non-circular profile, shaped to constrain a rotational orientation of the bundle of conduits within the pulling device, where the interior pocket has one open end and one closed end. In some cases, the operations of this step refer to, or may be performed by, a pulling device as described with reference to FIGS. 1-7, and 10-12.

At operation 1410, the method inserts one end of the bundle of conduits into the interior pocket of the pulling device. In some cases, the operations of this step refer to, or may be performed by, a pulling device as described with reference to FIGS. 1-7, and 10-12.

At operation 1412, the method inserts one or more fasteners through the one or more apertures in an exterior periphery of the pulling device and into the outside surface of one or more of the conduits to secure the bundle of conduits within the interior pocket of the pulling device.

At operation 1415, the system attaches the pulling device to a pulling mechanism via a pulling eye configured to allow the pulling device to be pulled through a bore hole. In some cases, the operations of this step refer to, or may be performed by, a pulling device as described with reference to FIGS. 1-7, and 10-12.

At operation 1420, the system pulls the pulling device and the bundle of conduits having been attached to the pulling mechanism through the bore hole using the pulling mechanism, where the pulling device further includes one or more apertures extending from a perimeter surface of an exterior of the pulling device to the interior pocket, the one or more apertures being sized and located to receive a fastener or fasteners, where the one or more apertures are at one or more angles between positive and negative 60 degrees from normal relative to a central axis of the pulling device. In some cases, the operations of this step refer to, or may be performed by, a pulling device as described with reference to FIGS. 1-7, and 10-12.

Additionally, a method for pulling a bundle of conduits is described. One or more aspects of the method include forming an interior pocket at a distal end of the pulling device to receive one end of the bundle of conduits; shaping at least a portion of the interior pocket to have a non-circular profile to constrain rotational orientation of the bundle of conduits within the pulling device; and creating one or more apertures extending from a perimeter surface of an exterior of the pulling device to the interior pocket, sized and located to receive a fastener or fasteners. In some aspects, the one or more apertures are at angles between positive and negative 60 degrees from normal relative to a central axis of the pulling device. In some aspects, the non-circular profile of the interior pocket is shaped to match the non-circular exterior profile of the bundle of conduits.

In some aspects, the fastener or fasteners are screws. In some aspects, the fastener or fasteners are bolts and nuts.

Some examples of the method further include forming a pulling eye to allow the pulling device to be pulled through a borehole. In some aspects, the pulling device is made of steel.

In some aspects, the creating the one or more apertures comprises creating the one or more apertures counterbored to match heads of the fastener or fasteners. In some aspects, the fastener or fasteners are high-strength self-tapping screws with a piloting drill point. In some aspects, the fastener or fasteners are wood screws, sheet metal screws, or cotter pins. Some examples of the method further include attaching the pulling device to the bundle of conduits by inserting the fastener or fasteners through the one or more apertures and into the conduits.

Figure 15:
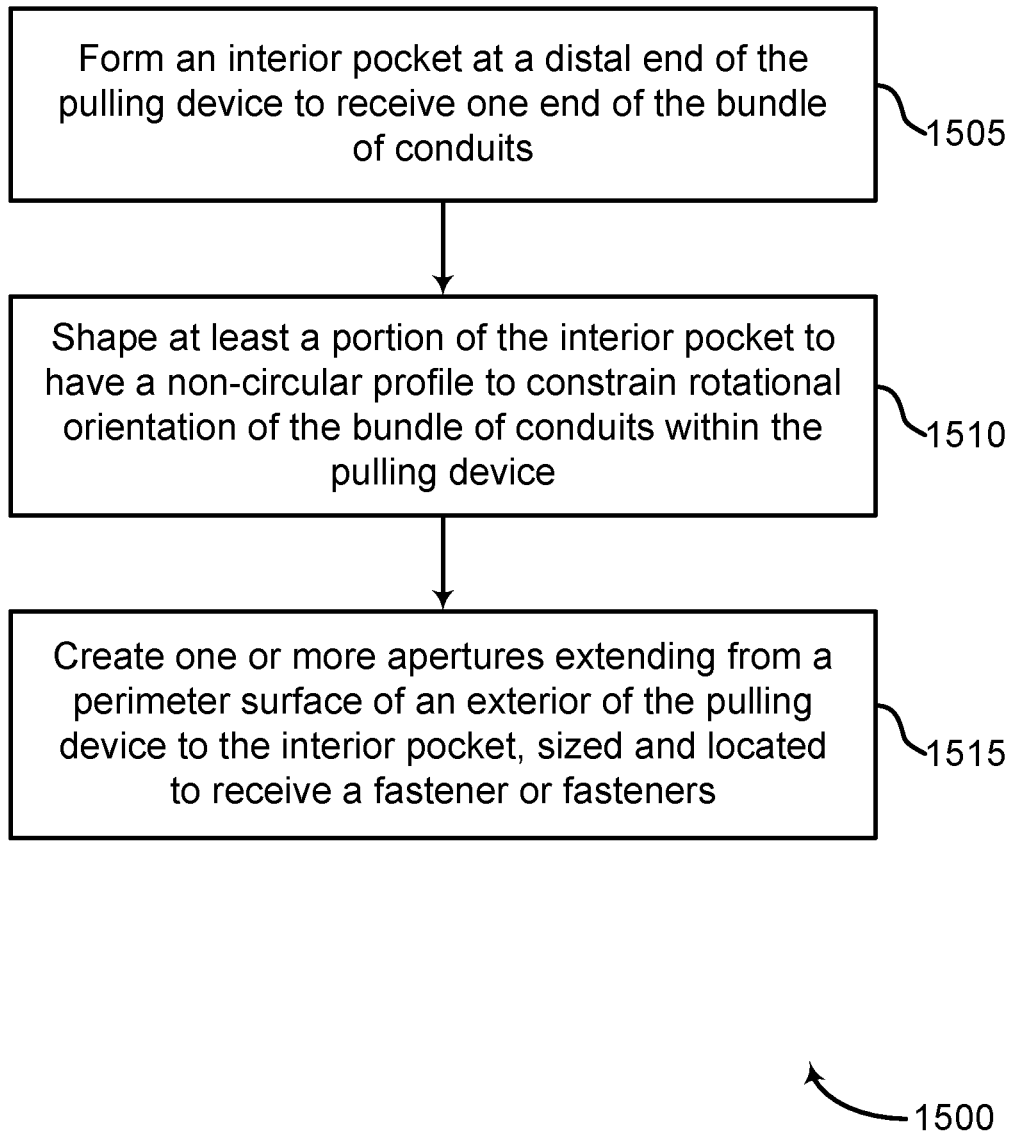
FIG. 15 shows an example of a method for making a pulling device for a bundle of conduits, according to aspects of the present disclosure.

FIG. 15 shows an example of a method 1500 for infrastructure systems according to aspects of the present disclosure. In some examples, these operations are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system forms an interior pocket at a distal end of the pulling device to receive one end of the bundle of conduits. In some cases, the operations of this step refer to, or may be performed by, an interior pocket as described with reference to FIGS. 2, 5, 6, 10, and 11.

At operation 1510, the system shapes at least a portion of the interior pocket to have a non-circular profile to constrain rotational orientation of the bundle of conduits within the pulling device, and. In some cases, the operations of this step refer to, or may be performed by, an interior pocket as described with reference to FIGS. 2, 5, 6, 10, and 11.

At operation 1515, the system creates one or more apertures extending from a perimeter surface of an exterior of the pulling device to the interior pocket, sized and located to receive a fastener or fasteners, where the one or more apertures are at angles between positive and negative 60 degrees from normal relative to a central axis of the pulling device. In some cases, the operations of this step refer to, or may be performed by, an aperture as described with reference to FIGS. 1, 2, 7, 11, and 12.

While the invention herein disclosed has been described by means of specific embodiments, examples and applications thereof, numerous modifications and variations could be made thereto by those skilled in the art without departing from the scope of the invention set forth in the claims.

What is claimed is:

1. A pulling device used to attach to a bundle of conduits, the bundle having a non-circular exterior profile, said pulling device comprising:
    a distal end having a generally cylindrical exterior surface and an interior pocket to receive one end of the bundle of conduits, with at least a portion of the interior pocket having a non-circular profile, shaped to constrain a rotational orientation of the bundle of conduits within the pulling device, wherein the interior pocket has one open end and one closed end;
    a pulling eye configured to allow the pulling device to be pulled through a bore hole;
    wherein one or more apertures extend from the cylindrical exterior surface of the pulling device to the interior pocket, sized and located around the cylindrical exterior surface of the pulling device to receive a fastener or fasteners, where the one or more apertures are at one or more angles between positive and negative 60 degrees from normal relative to a central axis of the pulling device; and
    wherein at least one of the one or more apertures is located such that each received fastener cuts through a sidewall of a conduit to attach the bundle of conduits.

2. The pulling device of claim 1, where the fastener or fasteners are screws.

3. The pulling device of claim 1, where the fastener or fasteners are bolts and nuts.

4. The pulling device of claim 1, wherein the pulling device comprises steel.

5. The pulling device of claim 1, wherein the non-circular profile of the interior pocket is shaped to match at least a portion of a cross-section of the exterior of the bundle of conduits.

6. The pulling device of claim 1, said pulling device further comprising:
    the bundle of conduits, said bundle of conduits comprising a bundle of more than one small, round conduits contained within a plastic sheath.

7. The pulling device of claim 1, wherein said one or more apertures comprises a plurality of apertures, and wherein said one or more angles of the plurality of apertures comprises a plurality of angles.

8. The pulling device of claim 1, further comprising:
said one or more apertures configured to receive threaded fasteners.

9. The pulling device of claim 1, further comprising:
one fastener received at each of the one or more apertures in the pulling device and installed inside the pulling device to attach the bundle of conduits.

10. The pulling device of claim 1, further comprising an insert or spacer configured to adapt the pulling device to multiple conduit bundle sizes and shapes.

11. The pulling device of claim 10, wherein the insert or spacer comprises one or more holes, slots, or other apertures that align with the one or more apertures in the pulling device.

12. A method for pulling a bundle of conduits, the bundle having a non-circular exterior profile, comprising the steps of:
providing a pulling device comprising a distal end having a generally cylindrical exterior surface and an interior pocket to receive one end of the bundle of conduits, with at least a portion of the interior pocket having a non-circular profile, shaped to constrain a rotational orientation of the bundle of conduits within the pulling device, wherein the interior pocket has one open end and one closed end, and wherein the pulling device further comprises a pulling eye configured to allow the pulling device to be pulled through a bore hole and one or more apertures extending from the cylindrical exterior surface of the pulling device to the interior pocket, the one or more apertures being sized and located to receive a fastener or fasteners, wherein the one or more apertures are at one or more angles between positive and negative 60 degrees from normal relative to a central axis of the pulling device, wherein at least one of the one or more apertures is located such that each received fastener cuts through a sidewall of a conduit to attach the bundle of conduits;
inserting one end of the bundle of conduits into the interior pocket of the pulling device;
attaching the pulling device to a pulling mechanism via a pulling eye configured to allow the pulling device to be pulled through a bore hole; and
pulling the pulling device and the bundle of conduits having been attached to the pulling mechanism through the bore hole using the pulling mechanism.

13. The method of claim 12, further comprising the step of inserting one or more fasteners through the one or more apertures and into the bundle of conduits to secure the bundle of conduits within the interior pocket of the pulling device.

14. The method of claim 12, wherein the fastener or fasteners are screws.

15. The method of claim 12, wherein the fastener or fasteners are bolts and nuts.

16. The method of claim 12, wherein the pulling mechanism is a horizontal directional drilling rig.

17. The method of claim 12, further comprising the step of inserting a spacer into the interior pocket of the pulling device before inserting the bundle of conduits, the spacer being configured to adapt the pulling device to receive the bundle of conduits.

18. The method of claim 17, wherein the spacer comprises one or more apertures that align with the one or more apertures of the pulling device.

19. The method of claim 12, further comprising the step of sealing ends of individual conduits of the bundle of conduits to prevent entry of drilling fluid or other debris.

20. The method of claim 19, wherein said sealing said ends comprises wrapping an exterior of the bundle of conduits with one or more layers of tape.

21. A method for making a pulling device for a bundle of conduits, the bundle having a non-circular exterior profile, comprising the steps of:
forming an interior pocket at a distal end of the pulling device to receive one end of the bundle of conduits, wherein the distal end has a generally cylindrical exterior surface and the interior pocket has one open end and one closed end,
shaping at least a portion of the interior pocket to have a non-circular profile to constrain rotational orientation of the bundle of conduits within the pulling device,
forming a pulling eye configured to allow the pulling device to be pulled through a bore hole, and creating one or more apertures extending from the cylindrical exterior surface of the pulling device to the interior pocket, sized and located to receive a fastener or fasteners, wherein at least one of the one or more apertures is located such that each received fastener cuts through a sidewall of a conduit to attach the bundle of conduits,
wherein the one or more apertures are at angles between positive and negative 60 degrees from normal relative to a central axis of the pulling device.

22. The method of claim 21, wherein the non-circular profile of the interior pocket is shaped to match the non-circular exterior profile of the bundle of conduits.

23. The method of claim 21, wherein the fastener or fasteners are screws.

24. The method of claim 21, wherein the fastener or fasteners are bolts and nuts.

25. The method of claim 21, wherein the pulling device is made of steel.

26. The method of claim 21, wherein said creating said one or more apertures comprises creating said one or more apertures counterbored to match heads of the fastener or fasteners.

27. The method of claim 21, wherein the fastener or fasteners are high-strength self-tapping screws with a piloting drill point.

28. The method of claim 21, wherein the fastener or fasteners are wood screws, sheet metal screws, or cotter pins.

29. The method of claim 21, further comprising the step of attaching the pulling device to the bundle of conduits by inserting the fastener or fasteners through the one or more apertures and into the conduits.

* * * * *